July 15, 1924.
W. S. SMITH
SCALE
Filed Dec. 30, 1920
1,501,141
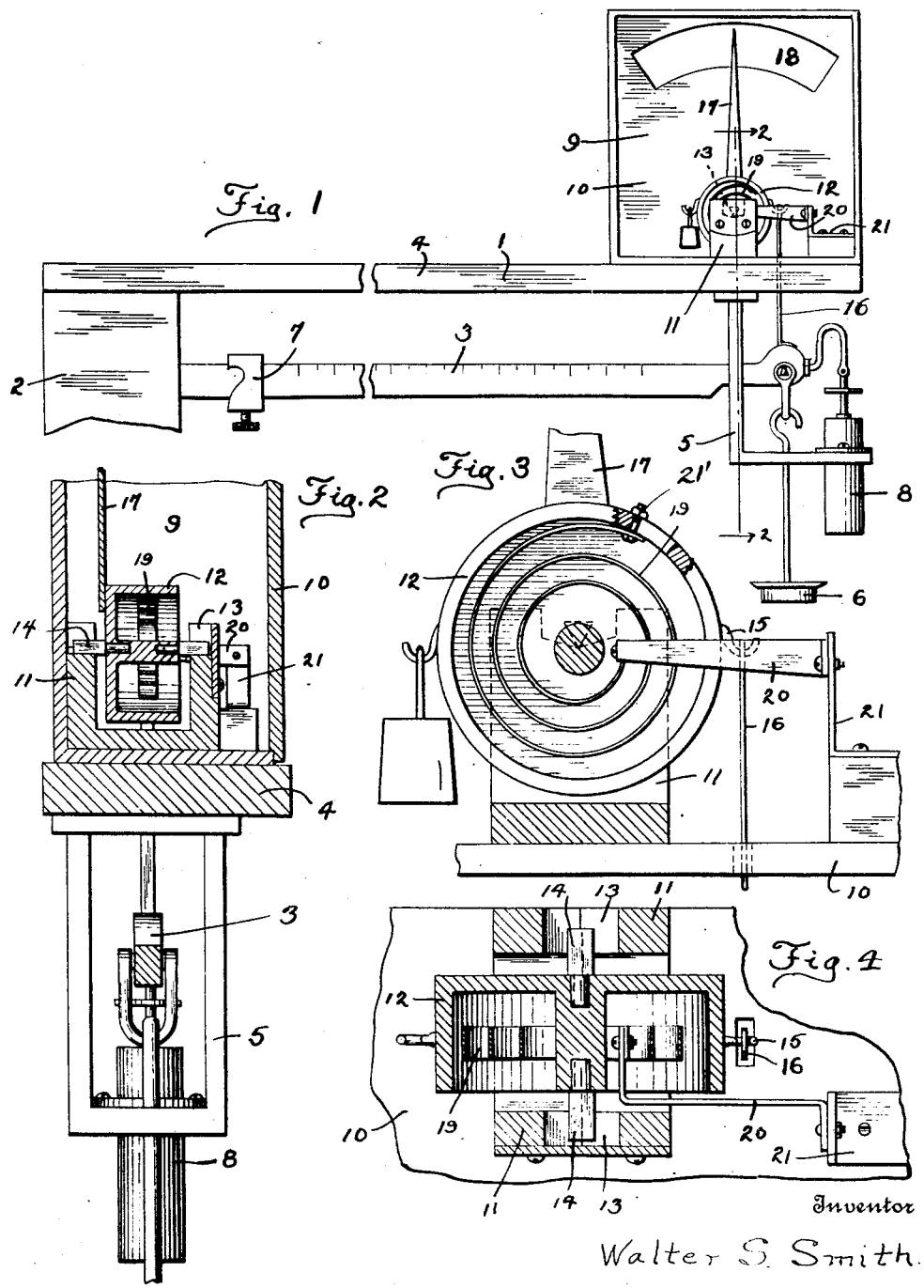
Inventor
Walter S. Smith.
By C. C. Shephard
Attorney Patented July 15, 1924.

1,501,141

UNITED STATES PATENT OFFICE.

WALTER S. SMITH, OF COLUMBUS, OHIO.

SCALE.

Application filed December 30, 1920. Serial No. 433,967.

*To all whom it may concern:*

Be it known that WALTER S. SMITH, a citizen of the United States, residing at Columbus, in the county of Franklin and State of Ohio, has invented certain new and useful Improvements in Scales, of which the following is a specification.

This invention relates broadly to scales, and has particular reference to scales of the type wherein movable weight beams are provided, the object of the invention being generally to provide an improved weight indicated mechanism in conjunction with a movable beam, in order that the movements of the latter may be amplified and imparted to a weight indicating mechanism, so that fine readings may be had and the accuracy of the scale thereby enhanced.

Another object of the invention resides in providing a platform or other similar scale with a pivotally movable weight denoting beam which when suitably balanced will serve to denote the weight of the material placed upon the scale, and in the provision of an improved weight indicating mechanism which is adapted to be operated by the movements of the beam in order that such movements will be suitably magnified and the weight recording properties of the scale thereby rendered particularly sensitive.

In the average platform scale a pivoted beam is provided and is located in such manner that the weights imposed upon the scale platform may be counterbalanced by removable and adjustable weights adapted to be carried by the free end of the beam, the construction being such that when the weight on one end of the beam is counterbalanced by the weight on the other end thereof, the beam will assume a neutral position, indicating the balance obtained. While this construction is fully capable of recording weights more or less roughly, practice has disclosed that it is not absolutely accurate in recording small fractional parts of a point, and accordingly when accurate measurements are desired scales of the type under discussion are not reliable, as under or over weights are invariably present. This condition is mainly attributable to the fact that the oscillations of the beam are visually relied upon to indicate a weight balance, and therefore it is obvious that if the beam should vary slightly from its true neutral position of balance an inaccuracy in reading of a weight will be the result.

The present invention consists particularly in the provision of means operating in conjunction with a movable weight beam for the purpose of amplifying the movements of the latter, and thereby to render the slightest movements on the part of the beam on both sides of its neutral position of balance clearly discernible so that proper correction, if necessary, may be made in the balance of the weights. The indicating means consists essentially of a rotatable member which is linked to rotate or oscillate positively in unison with the movements of the pivoted beam, said member carrying an indicating hand which is normally disposed to occupy a neutral position, whereby when the beam is oscillated from its position of true balance, said hand will be similarly operated to visually disclose the extent of deviation of the beam from its position of true balance.

A further object of the invention resides in providing the rotatable member of the indicating mechanism with a sensitive, friction minimizing knife edge mounting, which will render the indicating mechanism instantly responsive to the movements of the scale beam and with an absence of undue movement retarding friction, said rotatable member having associated therewith an improved spring structure which is normally positioned in such manner as to return the indicating hand to its neutral position so as to harmonize the relationship of said hand with the position of true balance of the scale beam.

With these and other objects in view, as will appear as the description proceeds, the invention accordingly consists in the novel features of construction, combinations of elements, and arrangement of parts, hereinafter to be fully described and to have the scope thereof pointed out in the appended claims.

In the accompanying drawing, forming a part of this specification, and in which similar characters of reference denote like and corresponding parts:

Figure 1 is a side elevation of the upper portion of a platform scale, and illustrating more particularly the application of the improved weight indicating mechanism employed in conjunction therewith, Figure 2 is a vertical transverse sectional view taken on the plane disclosed by the line 2—2 of Figure 1, Figure 3 is a detail elevational view disclosing the mounting for the indicating mechanism, and Figure 4 is a horizontal sectional view taken through the mounting.

In the form of the invention illustrated in the drawing, the numeral 1 designates the upper portion of a platform scale, and accordingly there is shown the upright casing 2 of the scale, the pivoted weight denoting beam 3, and the parallel superposed horizontally extending frame bar 4. These parts are of conventional construction, and therefore it will be understood that the pivot mounting for the beam 3 may be of any suitable design, and that the beam is connected at its inner pivoted end with the platform structure (not shown) of the scale. The outer free end of the beam 3 is disposed to oscillate within a suitable bracket 5 depending from the under side of the bar 4, and the outer end of the beam is provided, as usual, with a pivotally depending weight receiving pan 6, by means of which weights may be added or removed in the usual manner to effect the balance of the beam. Also, the beam is provided with the ordinary slidably adjustable indicating weight 7, which is movable over the graduated surface provided upon the beam, obviously, by means of the construction described the scale 1 may function in the usual manner to obtain more or less roughly a reading of the weights imposed upon its platform. It will be understood that the beam is of a type that when properly counterbalanced the same will oscillate to a true balanced or neutral position, thereby visually indicating the weight of the matter imposed upon the scale. If desired an ordinary dash pot construction 8 may be connected with the extreme outer end of the beam 3 for the usual purpose of expediting the balance of the beam.

It will be manifest from the construction so far described that the scale 1 is of conventional form, and that the same will operate in the usual manner to record imposed weights. However, practice has disclosed that a scale constructed in the manner described while efficient in obtaining comparatively rough weight readings, is yet not capable of securing fine and accurate readings, particularly small fractional portions of a pound, and that by reason of this fact such scales are not reliable in measuring substances wherein a more or less high degree of accuracy in weight reading is imperative or to be desired. Therefore, in order to render the scale 1 more sensitive, the present invention consists in providing in conjunction therewith a supplemental weight indicating mechanism 9.

This mechanism in the form of the invention illustrated, consists of a housing 10, which is carried upon the upper surface of the frame 4. This housing is formed to include a bifurcated bracket 11, within which is rotatably or oscillatingly mounted a drum member 12. The side walls of the bracket 11 are provided with aligned recesses 13, within which are positioned the laterally extending knife edges 14 of the drum 12, this mounting is such as to provide for the free and easy movement of the drum member, and to largely eliminate friction in its operation. A hook 15 is provided upon the periphery of the drum member and is adapted to be inserted into an opening formed in the upper end of the vertically extending link or bar 16, the latter being disposed to extend downwardly through openings provided in the bottom of the housing 10 and the frame bar 4 and has its lower end suitably connected in any positive manner to the free end of the beam 3. Manifestly, by the provision of the link 16 the drum member 12 will be caused to oscillate on its knife edges in unison with the oscillation of the scale beam.

The drum member in this instance is provided with an upwardly extending indicator hand 17, the outer extremity of which may be viewed through one or more arcuate slots 18 provided in the housing 10, and the free end of this hand is preferably movable over a graduated surface, preferably marked to indicate ounces, so that when the hand assumes its neutral position in the center of the housing, the operator will be assured that the beam 3 has reached a position of balance. By the construction set forth it will be apparent that slight movements on the part of the outer end of the beam 3 from its proper position of balance, will be transmitted to the hand 17 by the link construction described, and that the movement of the beam will be imparted in an amplified manner to the outer end of the hand 17. Thus if the beam is not truly balanced, the fact will be made known by observing the position of the hand 17 and by denoting its deflection from its neutral position. This will enable the operator to add or remove weight from the scale platform in order that the hand may be restored to its neutral position, thus indicating an exact weight quantity and also insuring the operator that the beam 3 has reached a position of true balance. By virtue of the mechanism 9, therefore, over or under weights amounting to small fractional portions of a pound may be readily detected and corrected.

In order to maintain the hand 17 in its neutral position and to harmonize the same with the balance of the beam 3 so that when the hand is in its neutral position said beam will be balanced, the drum member 12 is internally provided with a spiral spring 19. This spring has its inner end rigidly attached to an arm 20 which latter is, in turn, carried by a bracket 21 located within the housing 10. The outer end of the spring is fixed adjustably as at 21' to the inner peripheral wall of the drum member, and the tension of the spring is such that when the arm 20 assumes its neutral or center position the spring will lie quiescent and without tension, thus relieving the beam 3 of the influence of the indicating mechanism when said beam is balanced. However, when the beam is oscillated from a position of true balance and the indicator hand 17 rocked, the spring will be placed under tension, which latter is such as to normally urge the hand to its neutral position. By the provision of the spring 19 a very sensitive balance is provided for the indicating mechanism, and one which will be instantly responsive to the fluctuations of the indicating beam 3, the arrangement of the spring being such as to normally hold the knife edges in their centralized positions within the recesses 13.

From the foregoing description taken in conjunction with the accompanying drawing, it will be apparent that the present invention particularly comprehends improved means operating in conjunction with the balance beam of a scale for the purpose of obtaining accurate, fine and reliable readings from the weight recording mechanism of the scale. The parts are comparatively few in number, simple in arrangement and operation, and are not likely to become out of order or occasion repair. By virtue of the mechanism 9 the range of accuracy of an ordinary platform scale is widely increased, and readings may be taken from such a scale which have hitherto been considered impossible. While the spring construction 19 has been described for normally maintaining the indicating mechanism in the neutral position, it will be apparent that this exact construction is not absolutely necessary, as a torsion strip or its equivalent may be substituted in lieu thereof.

I claim:

1. In a scale, a frame, a movable beam carried by said frame, of means for amplifying the motion of said beam to facilitate weight readings, comprising an indicator structure formed to include an oscillatory indicator member, a resilient regulator for said member normally serving to maintain the latter in a neutral position when said beam assumes a balanced position, and a connection between the free end of said beam and said indicator structure, said connection serving to cause said indicator member to oscillate in unison with the movable beam.

2. In weight indicating mechanism for scales, the combination with a frame, a movable beam carried by said frame, means for amplifying the motion of said beam, comprising an indicator structure carried by said frame and formed to include a movable indicator member a resilient regulator for said indicator member normally tending to maintain the latter in a neutral position when said beam is balanced, and a connection between said member and indicator structure capable of moving the member from one side to the other of its neutral position upon the movements of said beam from its balance position.

3. In weight indicating mechanism for platform scales, the combination with a scale frame, of a movable beam pivotally mounted at one end in connection with said frame and capable of being oscillated, of means for multiplying the motion of said beam to facilitate weight readings, comprising an indicator structure mounted upon said frame contiguous to the free end of said beam and including an oscillatory indicator member, a resilient regulator for said member normally acting to maintain the latter in a neutral position when said beam is balanced, and a connection between said beam and indicator structure to oscillate said member in unison with said beam.

4. In weight indicating mechanism for platform scales, a frame, a balance beam pivotally carried by said frame, means for amplifying the weight recording movements of said beam including a housing carried by said frame contiguous to the free end of the beam, a supplemental indicator structure resiliently and oscillatingly mounted within said housing, a connection between the free end of said beam and said indicator structure, and resilient means normally serving to maintain said indicator structure in a neutral position.

5. In weight indicating mechanism for scales, a frame, a balance beam pivotally carried by said frame, an indicator structure carried by said frame and located in superimposed relationship with respect to the free end of said beam, a connection between the free end of said beam and said indicator structure, whereby the latter will oscillate in unison with the movements of the beam, and a spring regulated drum supporting said indicator structure and serving to maintain the latter in a neutral position when said beam assumes a position of balance.

6. In weight indicating mechanism for scales, the combination with a scale frame, an oscillatory beam pivotally carried by said frame, means for amplifying the weight recording movements of said beam, including a rigid mounting normally carried by said frame above the free end of said beam, an indicator structure swingingly mounted on knife edges upon said bearing, resilient means for regulating the indicator structure for maintaining the indicator structure in a balanced or neutral position, and a connection between said indicator structure and the free end of said beam.

7. A weight indicating mechanism for platform scales, the combination with a frame, a movable beam carried by said frame, of means for amplifying the weight denoting movements of said beam, comprising a bearing rigidly carried by said frame, a drum having laterally extending knife edges movably mounted upon said bearing, an indicator hand rigid with said drum, a spiral spring connected with said drum and with a fixed element and normally serving to maintain said drum in a balanced position upon said bearings, and a link connection between the peripheral portion of said drum and the free end of said beam.

In testimony whereof I affix my signature.

WALTER S. SMITH.